United States Patent [19]

Wenzel

[11] Patent Number: 4,702,827
[45] Date of Patent: Oct. 27, 1987

[54] PORTABLE FILTER
[75] Inventor: Robert J. Wenzel, Shreveport, La.
[73] Assignee: The Frymaster Corporation, Shreveport, La.
[21] Appl. No.: 852,424
[22] Filed: Apr. 16, 1986
[51] Int. Cl.$^4$ .................. B01D 29/04; B01D 35/26
[52] U.S. Cl. .................. 210/117; 210/167; 210/DIG. 8
[58] Field of Search .......... 210/DIG. 8, 167, 117, 210/440, 443, 241, 85, 117; 99/408

[56] References Cited

U.S. PATENT DOCUMENTS

| 3,263,818 | 8/1966 | Gedrich | 210/167 |
| 3,337,055 | 8/1967 | Starness et al. | 210/DIG. 8 |
| 3,630,361 | 12/1971 | Keating | 210/DIG. 8 |
| 4,195,667 | 4/1980 | Moore et al. | 137/51 |
| 4,210,123 | 7/1980 | Moore et al. | 126/27 |
| 4,324,173 | 4/1982 | Moore et al. | 99/37 |
| 4,591,434 | 5/1986 | Prudhomme | 210/DIG. 8 |

OTHER PUBLICATIONS

Advertising brochure, Broaster Model 765 "Fat Tender," V 96901 4-85, printed in the U.S.A.

Primary Examiner—Benoit Castel
Assistant Examiner—Richard D. Jordan
Attorney, Agent, or Firm—Hubbard, Thurman, Turner & Tucker

[57] ABSTRACT

A portable filter has an oil remove/return wand for insertion into a cooking apparatus utilizing hot oil. A flexible hose connects the wand to a motor pump and supports a motor direction control switch adjacent to the wand. A compartmentalized housing includes: a container having an inlet and an outlet, a removable filter holder mounted in the container, plumbing connecting the container inlet and outlet to the motor pump, a heating element for the outlet plumbing, a control panel having an OFF switch for connection to a power supply and FILTER and HEATER switches connected to the OFF switch, and indicator lights for the OFF, FILTER, HEATER switches. The motor direction switch is connected to the FILTER switch and to first and second delay circuits. The heater switch is connected to the heater element to apply power; while the heater switch is ON the filter switch cannot be activated. The filter switch selectively connects the first and second delay circuits to a reversible motor of the motor pump for delaying power application to the motor until the pump stops during switching between the oil removal and oil refill modes, respectively.

11 Claims, 8 Drawing Figures

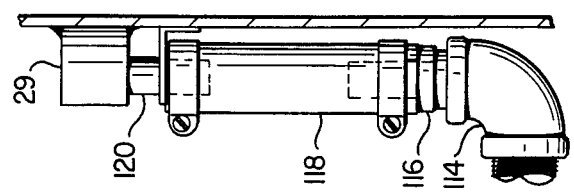
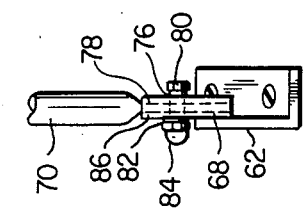
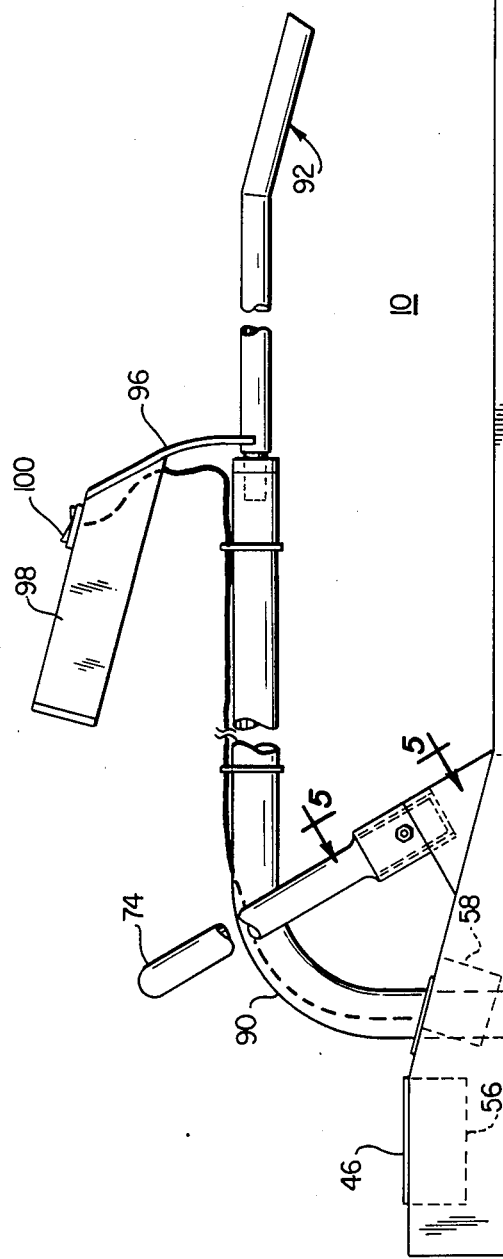
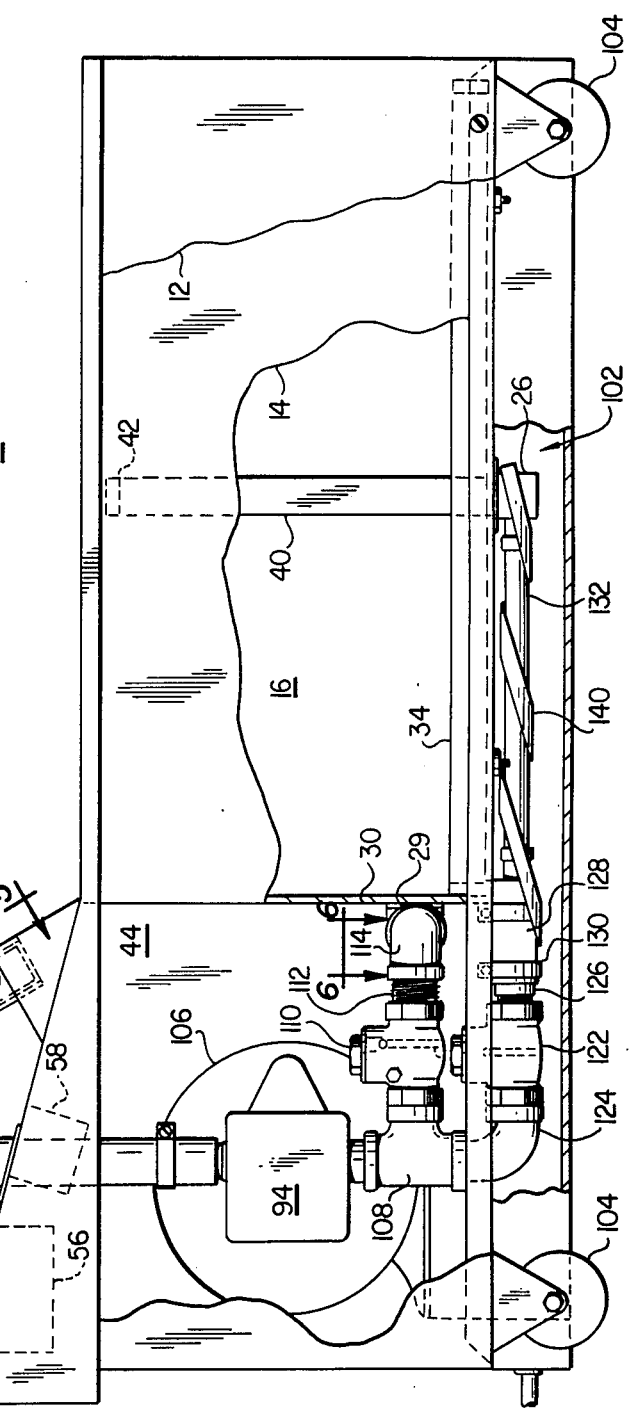

PORTABLE FILTER

BACKGROUND OF THE INVENTION

This invention relates to cooking equipment, and more particularly to a portable filter for filtering solid material from a reusable cooking medium.

In the past operators of cooking equipment have had available to them a console which housed side by side fry pots connected through a valve controlled conduit to a drain pan having a filter seive therein for removing the solid materials from the oil and a motor driven pump for returning the cooking oil to the fry pots. A control circuit was included for controlling operation of the fry pot heaters during the filter operation; this circuit included a safety circuit connected in series with the manually operated on/off heater switch. The safety circuit included a normally closed solenoid type switch, but during the filter operation is opened with the opening of the fry pot conduit and remains open until the manual switch is turned off and on again. Those persons desiring further details of this structure are referred to U.S. Pat. Nos. 4,195,667; 4,210,123; and 4,324,173.

More recently, a portable fat filter has become available which is for use with small to medium size (65 pounds) fryers. It has two-way action; a nozzle is inserted into the fryer and a switch, located on the portable oil container housing, is first switched to "fill" or gravity drain the cooking oil into a filter from the fryer; and secondly, switched to "return" for filtering and returning the cooking oil to the fryer. An independent heat control keeps the piping open and free flowing when solid shortening is used. The problem with these prior art type devices are, among others, that in the console system the safety circuit being tied into the heater circuit of the fry pots and being operable in connection with the fry pot outlet valve, is a different circuit which is not adaptable for use in a portable system. While the portable system by having an independent heat control, the heater is operable simultaneously with the pumping operations, this creates a fire hazard. As no operation indicator lights are provided, the possibility of improper operation is enhanced. Further, by having the operating switch remotely located with respect to the wand, the attention of the operator is diverted from the wand for switch operation; this creates a potential fire and safety hazard and oil mess, should the wand come out of the fryer during the oil return operation.

SUMMARY OF THE INVENTION

Accordingly, it is an object of this invention to provide a portable filter for cooking apparatuses which permits safe handling of the hot shortening for filtering and whose operation is both efficient and cost effective.

Another object of the invention is to alleviate breakdown of the cooking medium through frequent effective filtering.

Still another object of the invention is to reduce to a minimum the number of hand operations required for filtering.

A further object of the invention is to provide a filter which is easy to clean and maintain.

Still a further object of the invention is to provide a filter which utilizes an inexpensive disposable filter;

Yet still another object of the invention is to provide a portable filter which is adapted for convenient storage and quick assembly for safe usage.

Briefly stated the invention comprises a portable filter for a cooking apparatus utilizing a reusable cooking medium such as shortening or the like comprising a control means, a reversible pumping means whose operation is responsive to the control means, a filter holding container, a filter mounted in the holding container, and a flexible plumbing means. The flexible plumbing means is responsive to the reversible pumping means for selectively removing the liquid cooking medium from the cooking apparatus into the filter holder container and returning the filtered cooking medium to the cooking apparatus. The plumbing means includes a wand connected to a flexible tube for insertion into the hot cooking medium, and a deadman switch which provides a one time setting for the removal of cooking medium but which requires continuous pressure for the return operation. An inexpensive filter such as for example, paper is included in the container for removing solid particles from the cooking medium during the return operation. For cleaning, a wrap around heater is provided for melting any solid cooking medium in the plumbing.

BRIEF DESCRIPTION OF THE DRAWINGS

Other objects and features of the invention will become more readily apparent from the following detailed description when read in conjunction with the accompanying drawings in which:

FIG. 4 is a side view with portions of the housing wall cut away to disclose the double wall insulating structure and pan of the portable filter;

FIG. 5 is a cross sectional view of the handle construction taken along line A—A of FIG. 4;

FIG. 6 is a view of the container input plumbing taken along line B—B of FIG. 4.

DETAILED DESCRIPTION OF THE PREFERRED EMBODIMENT

Figure 3:
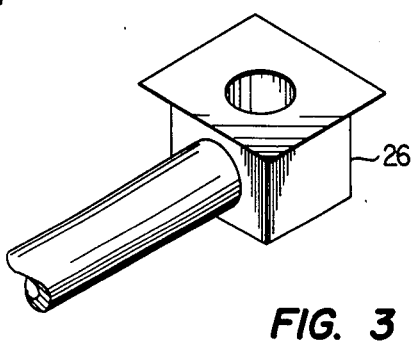
FIG. 3 is an isometric view of the container outlet.

The portable filter (FIGS. 1 and 4) includes a double walled housing 10 for insulating the exterior wall 12 of the housing from the inner wall 14 which forms a hot cooking medium container 16. The container 16 has an open top. A removable lid 18 (FIG. 1) having a handle 20 is provided for closing the container 16 during operation and storage and for opening the container for cleaning and filter changing. The bottom of the cooking medium container has a centrally disposed recessed area 22 with wall 24 forming a centrally disposed outlet aperture. An outlet block 26 having a reduced diameter "L" shaped passage (FIGS. 3 and 4) is attached to the bottom wall 24 by welding or brazing with its outlet in communication with the aperture. The block 26 is preferably a brass block. A screen 28 seats in the recessed area. To complete the container an inlet aperture 29 is formed by the wall 30 (FIG. 4), and a block having an "L" shaped passage of reduced diameter is welded or brazed to the outer side of wall 30.

Figure 1:
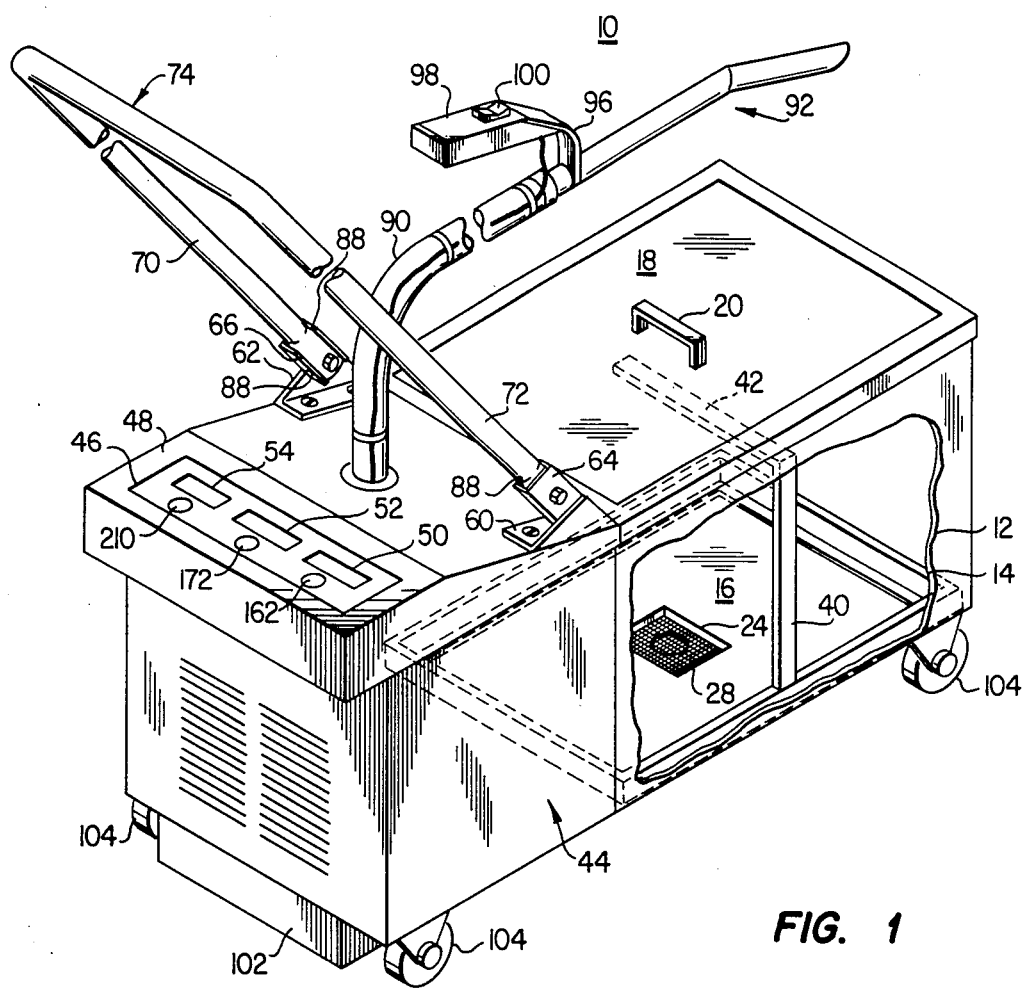
FIG. 1 is an isometric view of the portable filter with portions broken away to show interior details.
Figure 2:
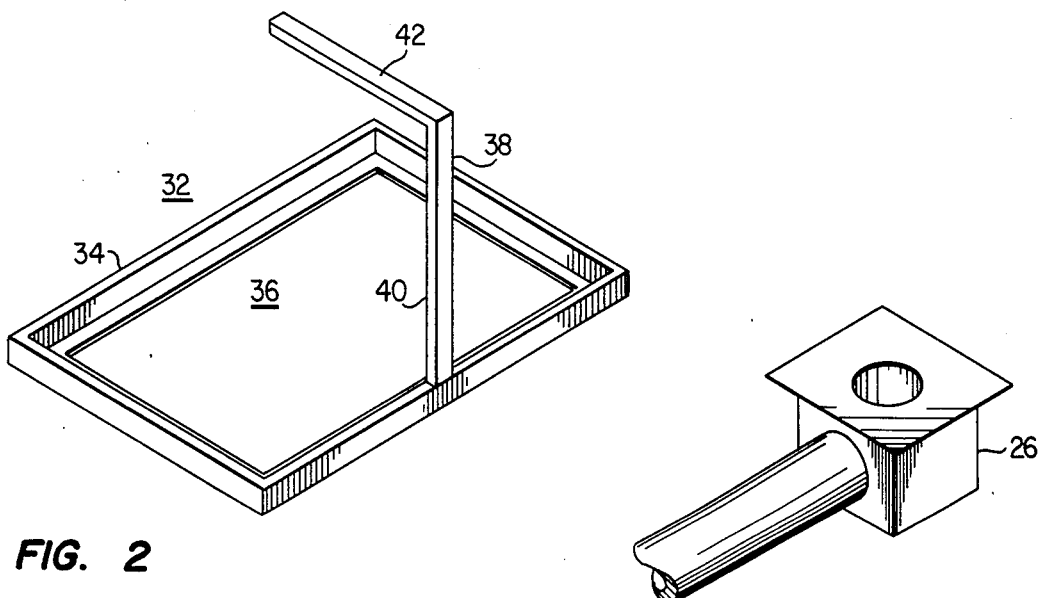
FIG. 2 is an isometric view of the filter rack.

A removable filter rack 32 (FIG. 2) having a recessed frame 34 for suitable filter 36, preferably a paper filter and having a shape corresponding to that of the container compartment 16 is provided for performing the filtering operation. An inverted L-shaped handle 38 has its leg or vertical member 40 attached to one side of the frame 34. The leg extends vertically upward thereof a distance for positioning its inwardly extending horizontal or handle forming member 42 adjacent to the top surface of the container 16 for facilitating the removal and insertion of the filter rack into the cooking medium compartment (FIGS. 1 and 4).

A louvered motor and pump compartment 44 (FIGS. 1 and 4) is formed by the housing 14 adjacent to the cooking medium container 16. A control panel 46 is attached to the top side 48 of the motor and pump compartment 44. The control panel 46 has OFF, HEAT, FILTER push button type selector switches 50, 52 and 54 (FIG. 1) mounted on its exterior side in communication with a control circuit mounted in receptacle 56 (FIG. 4) on the top side interiorly of the motor and pump compartment 44 adjacent to the control panel. The circuit compartment also includes a 120 V/12 V transformer power supply recepticle 58.

A pair of upwardly extending ears 60 and 62 (FIG. 1) are rigidly fixed to the top side 48 of the housing 14 covering the motor and pump compartment 44 and located adjacent to the cooking medium container 16. "U" shaped channel stubs 64 and 66 have their cross members 68 (FIG. 5) welded to the ears with the channels running vertically to receive the open arms 70 and 72 (FIG. 1) of a U-shaped handle 74.

A spacer sleeve 76 is positioned through an aperture formed by the walls of a flat plate like structure 78 formed of the tubular ends of handle 74. The spacer abuts the aperture forming wall 68 of the "U" shaped channel stub. The threaded end of a bolt 80 is passed through the sleeve 76 and channel aperture and secured to the "U" shaped channel stub by a lock washer 82 and lock nut 84 screwed onto the threaded end of bolt 80.

The channel stubs now provide a rigid support for the handle 74. For storage, the arm members are compressed to clear the retaining flanges of the stubs and folded against the top surface.

Returning to the housing (FIGS. 1 and 4) an aperture is provided in the top side 48 of the housing over the motor and pump compartment 30 through which a flexible hose 90 of a cooking medium handling tubular wand 92 is passed for connection to a pump 94 (FIG. 4), as hereinafter described. A switch support member 96 (FIGS. 1 and 4) is attached to the flexible hose 90 for supporting a wand handle 98. A two way pivotal switch 100 is mounted in the handle.

The switch 100 has a color coded actuator for ease in selecting the desired filter operation; that is, for example, the actuator position for cooking medium removal is colored white and the actuator position for cooking medium return is colored red. In the removal position, the switch actuator's white side, when pressed, locks in position and remains locked therein until turned off by renewed pressure applied by the operator. But, in the return position, the switch actuator requires continued pressure by the operator during the return operation. The continued attention of the operator to the grease return operation switch is a safety feature; if the switch could be locked and the wand for any reason when left unattended become free of the container, hot grease would flow outside the cooking apparatus and present a dangerous mess.

Finally, a bottom compartment 102 is provided for the return plumbing, hereinafter, described. This compartment is necessary for protecting personnel and property from the action of a heating element for the return plumbing. The bottom compartment 102 ends between wheels 104 attached to the housing. The wheels make the portable filter mobile.

The plumbing includes a reversible motor 106 (FIG. 4) for selectively driving a two way pump 94. A suitable motor is a ⅓ HP reversible motor and a suitable pump is a centrifugal pump capable of moving about 3.5 gallons per minute. The pump 94 is connected at one end to the wand's flexible hose 90 by a suitable clamp and at its opposite end to a T connector 108. The T connector joins the pump to the cooking medium removal path to the container 16 and to the return path from the container.

The cooking medium removal path includes a flap (check) valve 110 connected to the 90 degree outlet of the T connector. Check valve 110 opens pursuant to the cooking medium pressure to permit flow into the container during the removal operation, but closes to prevent cooking medium flow from the container during the return operation. A nipple 112 is connected to the check valve and to a 90 degree elbow 114. A reduction member 116 (FIG. 6) is connected to the elbow and a flexible plastic hose 118 is clamped by clamp to the reduction member. The inlet block 29 has a nipple to which the plastic hose is clamped. The use of the flexible hose isolates the inlet block from vibrations of the pump thereby enhancing safety and mean time before failure of the portable filter.

The cooking medium return path also includes a flap valve 122 (FIG. 4) connected to the T connector 108 through an elbow 124. A reduction nipple 126 is connected to the valve and a short piece of flexible tube 128, for example, of suitable heat resistant plastic material is clamped by clamps to the reduced portion of the reduction nipple. The brass block 26 includes a piece of metal tubing 130 (preferably copper) having one end clamped to the short piece of plastic tube 128. The block 26 and tubing form a reduced diameter passage for increasing the velocity of the hot oil through the return plumbing for increasing the pressure therein. The increased pressure facilitates the return pumping operation and the subsequent cleaning operation. A heat strip 132 is wrapped around the return plumbing and secured thereto by clamps. The heat strip is activated as described hereinafter to melt any shortening which has solidified in the return plumbing to facilitate cleaning.

Figure 7B:
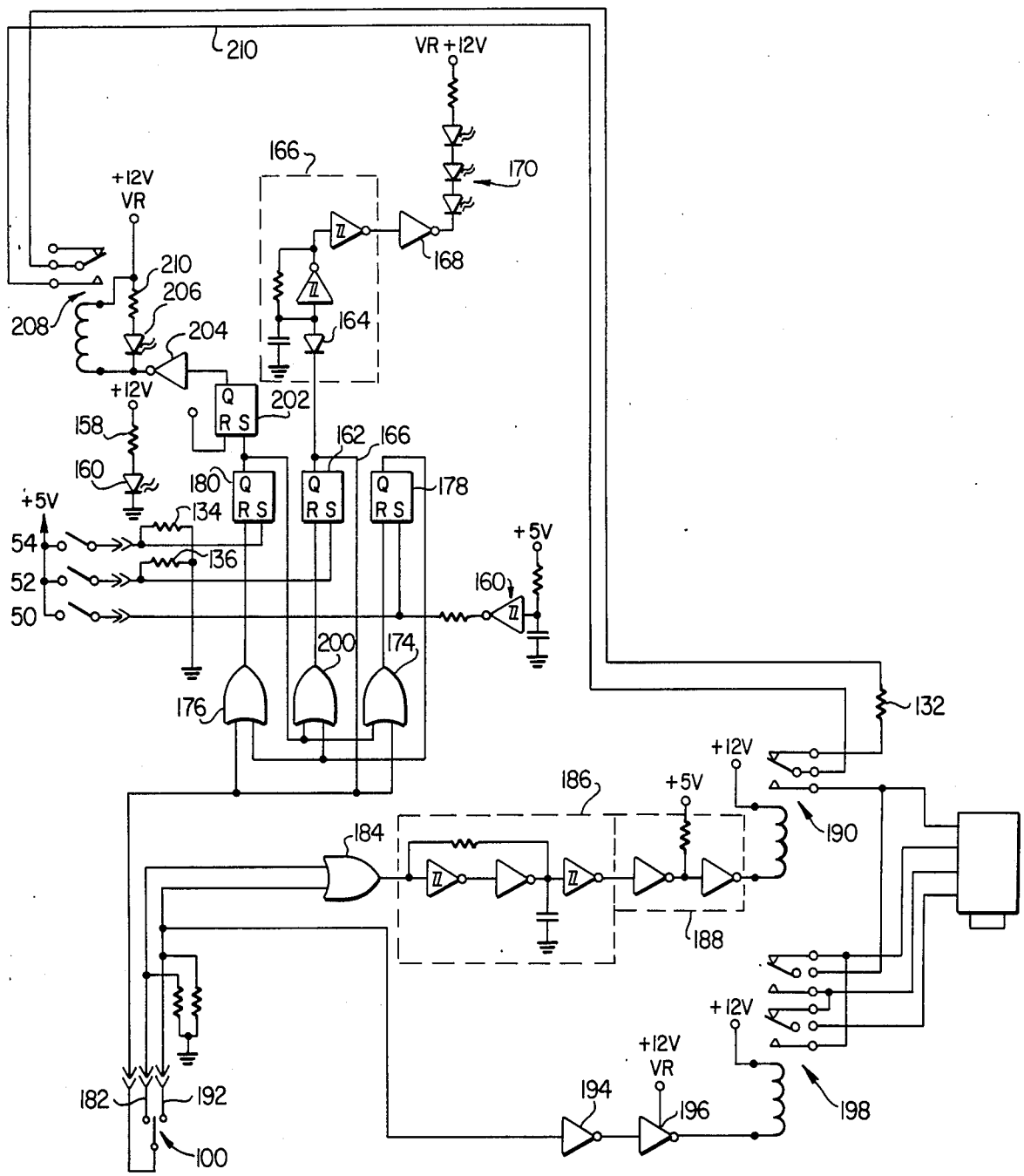
FIGS. 7a–7b constitute a schematic view of the circuitry for the portable filter.
Figure 7A:
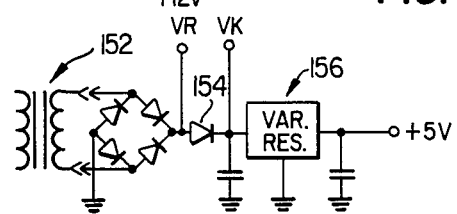

Referring now to FIG. 7a, the electrical circuitry includes the 120 V/12 V transformer power supply 150 and the power control circuits. The transformer power supply includes a full wave rectifier transformer circuit 152 for converting 120 V ac to +12 V dc for VR, a power dropping diode 154 for reducing the 12 V dc to about +15 V dc, a voltage source (Vk) to ensure a voltage above +5 V and a filter 156 having a solid state variable resistance acting device, for example, a 78Lo5, for removing any ripple and providing a stable +5 V source.

Referring now to FIG. 7b, when a plug is connected to a source to power, power is supplied through a resistor 158 to a light emitting diode (LED) 160 connected to ground for providing a power ON indicating light 162 (FIG. 1). The light remains on for as long as the unit is connected to the source of power.

With the power applied and a filtering job to be done, the filter switch 52, (FIG. 7b) is closed and power flows to the set (S) terminal of a flip-flop 162 and power flows to the junction of a diode 164 and lead 166. The diode 164 turns on a Schmitt trigger controlled RC oscillator circuit 167 and oscillating power flows through an inverter 168 to apply an operating potential to a plurality of LEDs 170. The oscillating power makes the LEDs turn on and off to provide a flashing light 172 at the control panel (FIG. 1).

Lead 166 connected to the filter switch flip-flop 162 provides power through OR gates 174 and 176 to the reset (R) terminals of flip-flop 178 and 180, respectively, to inhibit their operation and to the pole of wand switch 100 (FIGS. 1 and 7b).

For cooking medium removal, the white side 182 of switch 100 is selected and power flows through OR gate 184 to a Schmitt trigger with an RC delay circuit 186. The Schmitt trigger with delay turns on after a delay time sufficient to permit the pump motor to come to rest before reversing direction from either way and power flows through a signal level restoration circuit 188 to energize relay coil of relay switch 190. With the relay switch 190 closed power flows through the motor in a first direction to drive the motor and pump to remove the hot cooking medium from the cooking apparatus for filtering.

When it is desired to return to the hot cooking medium the red side 192 of switch 100 is selected. Power then flows to the junction of inverter 194 and OR gate 184. A power amplifier 196 closes the relay switch 198; while, the OR gate drives the Schmitt trigger and delay 186 to close relay switch 190 after a short delay time to permit the motor to come to rest before reversing direction. Power is then flowing through the motor in a second direction to drive the motor and pump in a second (reverse) direction to return the hot cooking medium through the filter to the cooking apparatus. When pressure is removed from the red switch side 192 the switch 100 opens to shut down the motor.

After completing the filtering operation, the portable filter is shut off by closing the OFF switch 50. When closed power flows from the off switch to the junction of the set (S) terminal of flip-flop 178 and a Schmitt operated RC voltage regulator means. The Schmitt operated voltage regulator ensures proper voltage at the terminal of flip-flop 178 to keep it operating properly. The output (Q) of flip-flop 178 is through OR gates 200 and 176 to the reset terminals of flip-flops 162 and 180 to cut off the flashing red light and power to the wand switch 100, and to maintain the heat flip-flop 180 in the off state.

When the cooking medium used is one that solidifies at room temperature, any left in the plumbing will solidify thereby adding difficulty to a cleaning operation. Thus, for cleaning, a heater is provided for the plumbing. To turn the heater on, the heater switch 54 on the control panel 46 (FIG. 1) is actuated. The heater switch 54 (FIG. 1) is connected to the set (S) terminal of flip-flop 180. Flip-flop 180 is responsive to turn on of the switch 54 to provide an output (Q) to a heater circuit flip-flop 202 and through OR gates 200 and 174 to the reset (R) terminals of flip-flops 162 and 178 to keep them off.

The heater circuit flip-flop 202 turns on in response to the flip-flop 180 output. An inverter 204 is connected to the junction of an LED 206 and coil of a relay switch 208 to provide negative power. The LED is connected through a resistor to the junction of a positive source of power VR and the coil or relay switch 208. Thus, connected LED 206 emits light for a control panel light 210 (FIG. 1) and the heater relay switch closes. Power flows from the relay switch 208 through lead 210 connected to motor relay switch 190.

The motor relay switch 190 without power is open as to the motor, but closed as to the heater circuit. Thus, the heater circuit cannot operate when the motor is running; motor selection also turns off the heater. With the relay switch 190 connected into the heater circuit, power flows to the wrap around heater 132. The heater is then operative to melt the solidifed shortening to facilitate its removal.

To complete the operation of the portable filter, when cleaned either the OFF switch 50 may be activated to shut down the system or the power connector plug 157 pulled, or both, and the portable filter is ready for storage. For storage the sides of the handle 74 are pressed to clear the ends of the channel stubs flanges and folded against the top side.

Although only a single embodiment of the invention has been described it will be apparent to a person skilled in the art that various modifications to the details of construction shown and described may be made without departing from the scope of the invention.

What is claimed is:

1. A portable filter for a cooking apparatus utilizing a reusable cooking medium comprising:
   a. a power supply means;
   b. a plurality of light indicator means including a light indicator responsive to the power supply for visibly indicating the presence of power;
   c. a plurality of control switching means operatively connected to the source of power, said switches including a filter selection control switch means responsive to actuation for passing power while inhibiting the remaining control switching means;
   d. a filter operation mode selection switch remotely located as to the plurality of control switches, the switch responsive to selected actuation for selectively passing power;
   e. first and second circuit means responsive to the filter operation mode selection switch for producing selectively first and second delayed power outputs;
   f. a motor operatively connected to the first and second circuit means for selected movement in first and second directions, said motor responsive to the delayed first and second delayed power outputs for changing its direction of movement with a delay there between whereby the motor comes to rest before changing direction;
   g. a pump means responsive to the motor means for providing a pumping action in first and second directions;
   h. a wand means flexibly connected to the pump, the wand means including a wand for insertion into the cooking apparatus;
   i. a plumbing means operatively connected to the pump, the plumbing means including first and second valve controlled passages;
   j. a portable housing means including a container having an inlet and an outlet, and a filter means said inlet and outlet operatively connected to the first and second valve controlled passages whereby the pump action and valve action coact in the first direction to pump the cooking medium into the container and in the second direction to pump the cooking medium from the container through the filter into the cooking apparatus; and
   k. a heater for the second direction passage and wherein the plurality of control switching means further includes a heater control switching means responsive to actuation for connecting a source of power to the heater while inhibiting the remainder of the plurality of control switching means.

2. A portable filter according to claim 1 wherein the plurality of light indicator means further includes a light indicator means responsive to the filter switch for producing a flashing light while the filter switch is closed.

3. A portable filter according to claim 2 wherein the plurality of control switching means further includes an OFF switch means responsive to actuation for inhibiting the filter selection control switch and corresponding light indicator means and the remaining control switches of the plurality of selector control switches.

4. A portable filter according to claim 1 wherein the plurality of light indicators further includes a light indicator means responsive to actuation of the heater control switch for providing a heater ON indicating light.

5. A portable filter according to claim 1 wherein the first circuit means includes a time delay means operatively connected to the filter operation mode selection switch and a motor switching means operatively connected to the time delay means, the time delay means responsive to power for delaying the application of power to the motor switching means for delaying the application of power to the motor whereby the motor comes to rest before moving in the first direction.

6. A portable filter according to claim 1 wherein the second circuit means includes a motor switching means operatively connected to the filter operation mode selection switch and to the first circuit means, said motor switching means of the second circuit responsive to delayed power for driving the motor in a second direction after a delay whereby the motor comes to rest before changing to the second direction.

7. A portable filter according to claim 1 wherein the portable housing means includes a double wall housing for insulating the outside from the container and further includes a motor and pump compartment, a control panel compartment, a plumbing compartment and a handle means, said handle means including an inverted U-shaped metal member, a pair of channel member means rigidly attached to the housing means and a fastening means operatively connecting the legs of the U-shaped handle means to the pair of channel members whereby the legs may be moved inwardly to disengage the pair of channel members for rotating the handle means against the housing means for storage.

8. A portable filter according to claim 1 wherein the second valve controlled passage of the plumbing means includes a metal block member rigidly attached to the container outlet forming wall, the block having walls forming an aperture having a first size and a metal tube rigidly secured to the metal block, a flexible hose connected to the metal tube, a reduction connector having a reduced end connected to the flexible hose and an end opposite the reduced end having a second size larger than the first size, a flap valve operatively connected to the reduction connector and to the pump means whereby the filtered cooking medium enters the block member responsive to the pump means, passes through the block and metal tube at an increased velocity to open the flap valve and return to the cooking apparatus.

9. A portable filter for a cooking apparatus utilizing a reusable cooking medium comprising:
   a. a portable housing including a container having an inlet and an outlet, and a filter means, first and second valve controlled passages connected to the container inlet and outlet, respectively, a pump connected to the first and second valve controlled passages, a reversible motor connected to the pump for driving the pump in first and second directions, and a wand means, the wand means including a flexible hose connected to the pump, a wand connected to the flexible hose for insertion into the cooking apparatus, and a switch attached to the flexible hose adjacent to the wand for controlling selectively the direction of the reversible motor for the removal and return of the cooking medium to the cooking apparatus; a control panel attached to the housing, the control panel including a power ON/OFF switch adapted for connection to a source of power, and connected to the switch of the wand means; and
   b. first and second circuit means interconnecting the switch on the wand flexible hose and reversible motor, the first and second circuit means responsive to the filter operation mode selection switch for producing selectively first and second power outputs to the motor wherein the reversible motor is driven selectively in first and second directions.

10. A portable filter according to claim 9 further including a heating element in operative association with the second valve controlled passage and wherein the control panel further includes a heater switch connected to the ON/OFF switch and a heater circuit operatively connected to the heater switch for controlling the heater circuit operation wherein selection of the filter selection switch inhibits selection of the heating circuit.

11. A portable filter according to claim 9 wherein the control panel further includes a plurality of indicators including a power ON indicator, and a filter switch selection indicator.

* * * * *